United States Patent
Vermande

(10) Patent No.: US 11,543,021 B2
(45) Date of Patent: Jan. 3, 2023

(54) LUBRICATION OF SCREW ACTUATORS

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 275 days.

(21) Appl. No.: 17/034,572

(22) Filed: Sep. 28, 2020

(65) Prior Publication Data
US 2021/0116018 A1 Apr. 22, 2021

(30) Foreign Application Priority Data
Oct. 17, 2019 (EP) ..................... 19290105

(51) Int. Cl.
*F16H 57/00* (2012.01)
*F16H 57/04* (2010.01)
*F16H 25/22* (2006.01)
*F16H 25/24* (2006.01)

(52) U.S. Cl.
CPC ..... *F16H 57/0497* (2013.01); *F16H 25/2204* (2013.01); *F16H 25/24* (2013.01); *F16H 57/0434* (2013.01); *F16H 57/0464* (2013.01)

(58) Field of Classification Search
CPC .. F16H 57/0497; F16H 25/2204; F16H 25/24; F16H 57/0434; F16H 57/0464; F16H 25/2015
See application file for complete search history.

(56) References Cited

U.S. PATENT DOCUMENTS 7,634,952 B2 * 12/2009 Chen ................... F16H 57/0497
74/89.44
8,302,499 B2 * 11/2012 Chen ................... F16H 57/0497
74/89.44
(Continued)

FOREIGN PATENT DOCUMENTS

CN 1840940 A 10/2006
CN 100489346 C 5/2009
(Continued)

OTHER PUBLICATIONS

Abstract of CN 108895156A, 1 page.
(Continued)

*Primary Examiner* — Victor L MacArthur
(74) *Attorney, Agent, or Firm* — Cantor Colburn LLP

(57) ABSTRACT

A screw actuator comprises a nut having an internal helical formation and a screw having an external helical formation and rotatably received within the nut, relative rotational movement of the nut and screw causing axial movement of one of the nut and screw relative to the other of the nut and screw. The actuator further comprises a lubricant reservoir and a lubricant pressuriser for pressurising lubricant within the lubricant reservoir. A lubricant receiving chamber is formed in the nut. The screw extends through the lubricant receiving chamber. A lubricant supply passage fluidly connects the lubricant reservoir and the lubricant receiving chamber. A valve controls the flow of lubricant between the lubricant reservoir and the lubricant receiving chamber. A lubricant supply piston is received in the lubricant receiving chamber and is mounted on the external helical formation of the screw.

15 Claims, 3 Drawing Sheets

(56) References Cited

U.S. PATENT DOCUMENTS

| | | | |
|---|---|---|---|
| 8,746,409 B2* | 6/2014 | Chiang | F16C 33/6659 |
| | | | 74/89.44 |
| 10,267,408 B2 | 4/2019 | Kang et al. | |
| 11,149,792 B2* | 10/2021 | Kreutzkaemper | F16C 33/4647 |
| 2007/0227281 A1* | 10/2007 | Chen | F16H 57/0497 |
| | | | 74/89.44 |
| 2010/0147092 A1 | 6/2010 | Jiang et al. | |
| 2016/0312953 A1* | 10/2016 | Holman | F16N 7/385 |
| 2019/0101208 A1 | 4/2019 | Morgan et al. | |
| 2021/0116018 A1* | 4/2021 | Vermande | F16H 57/0464 |

FOREIGN PATENT DOCUMENTS

| | | |
|---|---|---|
| CN | 108895156 A | 11/2018 |
| EP | 0010540 A1 | 5/1980 |
| TW | 201015000 A | 4/2010 |

OTHER PUBLICATIONS

Abstract of CN1811228A, 1 page.
Abstract of CN1840940A, 1 page.
Abstract of EP0010540A1, 1 page.
Abstract of TW201015000A, 1 page.
Extended European Search Report for International Application No. 19290105.6 dated Feb. 17, 2020, 9 pages.

\* cited by examiner

LUBRICATION OF SCREW ACTUATORS

FOREIGN PRIORITY

This application claims priority to European Patent Application No. 19290105.6 filed Oct. 17, 2019, the entire contents of which is incorporated herein by reference.

TECHNICAL FIELD

The present disclosure relates to screw actuators such as ballscrew actuators, and in particular to lubrication of such actuators.

BACKGROUND

Screw actuators such as ballscrew actuators are used to translate a rotational input into an axial displacement with minimal friction losses. Ballscrew actuators are used in a variety of applications, including in aircraft where they may be used to move control surfaces such as flaps and slats, and aircraft engine nacelles, for example in a thrust reversing system.

Ballscrew actuators are lubricated in order to facilitate relative motion between a ballscrew, ballnut and balls. To effect lubrication, a lubricant, normally a lubricant grease, is injected into the interface between the ballscrew and the ballnut. Although seals are normally provided at either end of the ballnut, lubricant escapes from the interface which means that the lubricant must be re-injected into the interface by an operator at regular intervals. This is undesirable as it is necessary to perform a manual maintenance activity in order to effect this process, which is costly.

It is therefore desirable to supply lubricant in a way which requires less manual replenishment.

SUMMARY

From a first aspect, the disclosure provides a screw actuator which comprises a nut having an internal helical formation and a screw having an external helical formation and rotatably received within the nut. Relative rotational movement of the nut and screw causes axial movement of one of the nut and screw relative to the other of the nut and screw. The actuator further comprises a lubricant reservoir and a lubricant pressuriser for pressurising lubricant within the lubricant reservoir. A lubricant receiving chamber is formed in the nut. The screw extends through the lubricant receiving chamber. A lubricant supply passage fluidly connects the lubricant reservoir and the lubricant receiving chamber. A valve controls the flow of lubricant between the lubricant reservoir and the lubricant receiving chamber. A lubricant supply piston is received in the lubricant receiving chamber and is mounted on the external helical formation of the screw. The lubricant supply piston is mounted to the screw with sufficient friction that in response to relative rotational movement of the screw and the nut resulting in relative axial movement of the screw and the nut, the lubricant supply piston can move axially with the screw relative to the nut through the lubricant receiving chamber so as to force lubricant from the lubricant receiving chamber into an interface between the nut and the screw, but such that the lubricant supply piston may rotationally slip on the screw when the lubricant supply piston reaches an axial limit position within the lubricant receiving chamber.

The lubricant pressuriser may comprise a pressurisation piston slidably mounted within the lubricant reservoir and a spring for urging the pressurisation piston into the lubricant reservoir to pressurise the lubricant.

The spring may be a mechanical spring, for example a compression spring.

In certain embodiments, the valve may comprises a radially outer surface of the lubricant supply piston which is arranged to selectively cover and uncover an outlet of the lubricant supply passage as the lubricant supply piston moves axially within the lubricant supply chamber.

The outlet of the lubricant supply passage may be is arranged adjacent a front surface of the lubricant supply piston when the lubricant supply piston is in a rearmost position within the lubricant receiving chamber.

In alternative embodiments, the valve may comprise a non-return valve arranged in the lubricant supply passage.

In such embodiments, an outlet of the lubricant supply passage may be arranged adjacent a front wall of the lubricant receiving chamber.

In all embodiments, the actuator may comprise one or stops for limiting the axial movement of the lubricant supply piston within the lubricant receiving chamber.

The stops may comprise interengaging rotary dogs provided on the lubricant supply piston and the lubricant receiving chamber respectively.

In certain embodiments, the screw may rotate and the nut may translate axially along the screw. In other embodiments, however, the nut may rotate and the screw may translate through the nut.

In all embodiments, the nut may be a ballnut and the screw may be a ballscrew, the helical formations on the nut and screw being respective grooves, the groove on the ballnut being opposed to the groove on the ballscrew so as to form at least one helical raceway therebetween, the actuator further comprising a plurality of balls or rolling elements disposed in the at least one helical raceway.

The disclosure also provides a method of supplying lubricant to a screw actuator comprising a nut and a screw rotatably received within the nut. The method comprises pressurising lubricant in a lubricant reservoir, selectively admitting lubricant from the lubricant reservoir into a lubricant receiving chamber within the nut, and pressing lubricant from the lubricant receiving chamber into an interface between the nut and the screw by means of a lubricant supply piston mounted on the screw within the lubricant receiving chamber and which moves axially with the screw through the lubricant receiving chamber in response to relative rotation of the screw and the nut.

Pressuring the lubricant within the lubricant reservoir may be effected by means of a spring loaded piston.

Lubricant may be admitted into the lubricant receiving chamber through a non-return valve.

In an alternative arrangement, lubricant may be admitted into the lubricant receiving chamber through a lubricant supply passage which is selectively opened and closed by the lubricant supply piston as it moves through the lubricant receiving chamber.

The lubricant supply piston may be mounted to the screw with sufficient friction that the lubricant supply piston can move axially with the screw through the lubricant receiving chamber in response to relative axial rotation of the screw and nut so as to force lubricant from the lubricant receiving chamber into the interface between the nut and the screw, but such that the lubricant supply piston may rotationally slip on the screw when the lubricant supply piston reaches an axial limit position within the lubricant receiving chamber.

DETAILED DESCRIPTION

Figure 2:
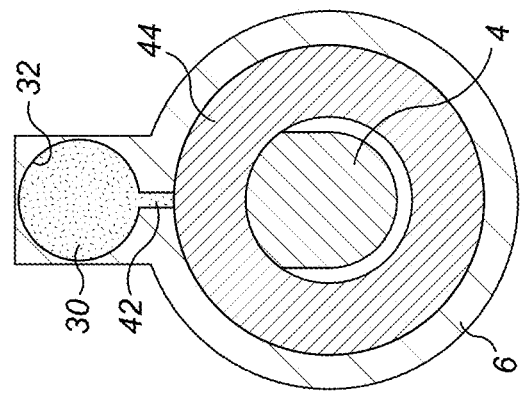
FIG. 2 shows a vertical cross-section along the line A-A of FIG. 1.
Figure 1:
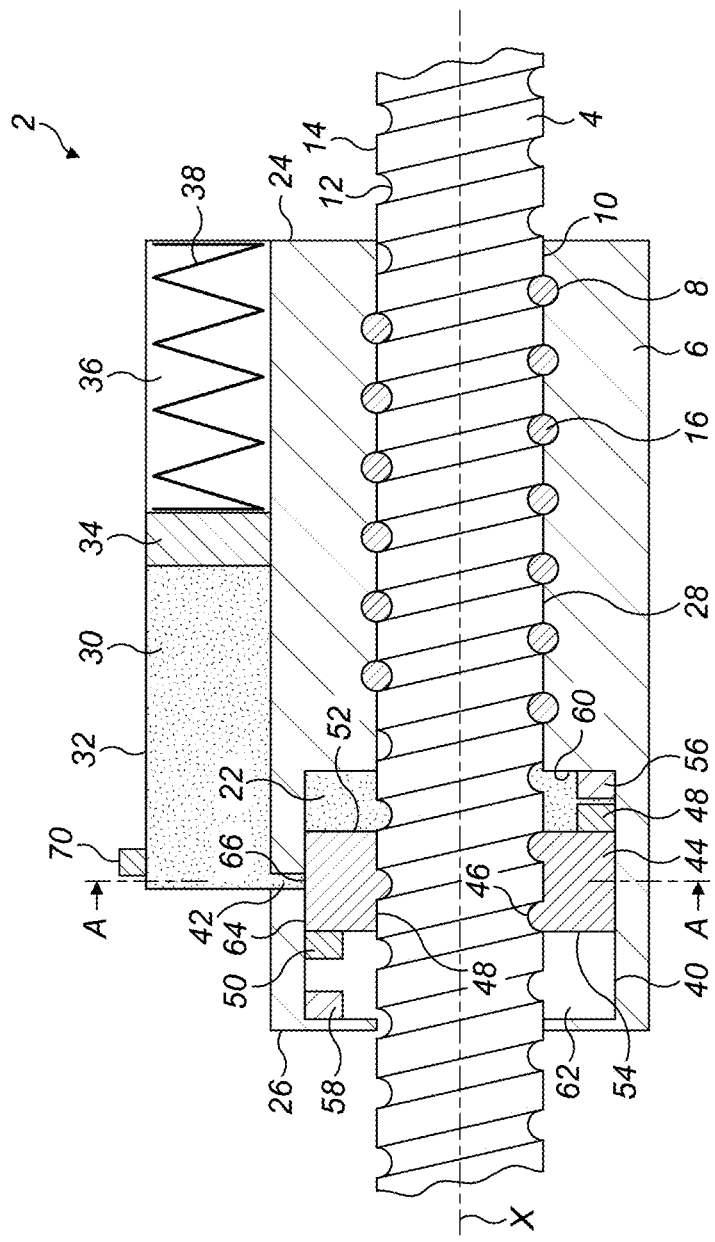
FIG. 1 shows, schematically, a first embodiment of ballscrew actuator in accordance with the disclosure.

With reference to FIGS. 1 and 2, a of ballscrew actuator 2 in accordance with the disclosure comprises a ballscrew 4 and ballnut 6.

The ballnut 6 has a first helical groove 8 formed on a radially inner surface 10 thereof. The ballscrew 4 is disposed along the axis X of the ballnut 6, and has a second helical groove 12 formed on a radially outer surface 14 thereof and opposed to the first helical groove 8 so as to form a helical raceway 16. A plurality of balls or other rolling elements 18 is disposed in the helical raceway 16 for transmitting movement between the ballnut 6 and the ballscrew 4. The balls 18 are recirculated within the raceway 16 in any convenient manner as known in the art. As is known in the art, a plurality of raceways 16 may be provided, with balls 18 being recirculated within each individual raceway 16.

The ballscrew 4 is translatable linearly relative to the ballnut 6, typically between a stowed position and a deployed position. This translation is effected by relative rotation of the ballscrew 4 relative to the ballnut 6. In the disclosed embodiment, the ballscrew 4 is rotated by a drive (not shown) about the axis X and the nut is attached to a translating structure such as an aircraft control surface The rotation of the ballscrew 4 will result in linear translation of the ballnut 6 along the axis X. In other embodiments, however, the ballnut 6 may be rotated and rotation and the ballscrew 4 translate.

The actuator 2 may be mounted in an aircraft. During operation of the aircraft, the actuator 2 may be used to operate primary or secondary control surfaces, or other components such as thrust reversers.

A lubricant 22, for example a lubricating grease, is received between the ballscrew 4 and the ballnut 6 to facilitate relative movement of the ballnut 6, ballscrew 4 and balls 18 and reduce wear. Wipers (not shown) may be disposed at opposed axial ends 24, 26 of the ballnut 6 in order to assist in retaining lubricant 22 in the interface 28 between the ballscrew 4 and the ballnut 6. The wipers will not, however, be completely effective in retaining the lubricant 22 within the interface 28 and after some time the lubricant 22 will have to be replenished. To date, this has been done manually at regular intervals, but this may have implications on operability of the aircraft, for example availability, and costs.

The illustrated actuator 2 of the disclosure incorporates a system which allows for replenishment of the lubricant 22 during operation of the actuator 2, thereby reducing the number of times manual replenishment is required, or in some instances obviating the need to replenish lubricant at all.

The actuator 2 in accordance with the disclosure further comprises a lubricant reservoir 30 for receiving a charge of lubricant 22. The lubricant reservoir 30 may be formed integrally with the ballnut 6 as shown, or formed as a separate component and suitably mounted to the ballnut 6. In this embodiment, the lubricant reservoir 30 comprises a cylindrical chamber 32.

The lubricant 22 in the lubricant reservoir 30 is pressurised. In the disclosed embodiment, the lubricant 22 is pressurised by a lubricant pressurizing piston 34 slidably received in the cylindrical chamber 32. The lubricant pressurizing piston 34 may be energised by any suitable means. For example, a chamber 36 arranged behind the lubricant pressurising piston 34 may receive a pressurised gas. However, in the illustrated embodiment, the lubricant pressurizing piston 34 is biased into the cylindrical chamber 32 by means of a spring 38 mounted in the chamber 36. The spring 38 may be any suitable form of compression spring, for example a coil spring.

The actuator 2 further comprises a lubricant receiving chamber 40 formed in the ballnut 6 and through which the ballscrew 4 extends.

A lubricant supply passage 42 is formed through a wall of the ballnut 6 and fluidly connects the lubricant reservoir 30 and the lubricant receiving chamber 40.

A lubricant supply piston 44 is slidably received in the lubricant receiving chamber 40 and is received on the external helical groove 12 of the ballscrew 4. The lubricant supply piston 44 is slidably received within the lubricant receiving chamber 40 and has a formation 46 on its radially inner surface 48 which is complementary to and received in the helical groove 12 formed on the radially outer surface 14 of the ballscrew 4. As will be described further below, the lubricant supply piston 44 is mounted to the ballscrew 4 with sufficient friction between them that the lubricant supply piston 44 can move axially with the ballscrew 4 through the lubricant receiving chamber 40 as the ballscrew 4 rotates relative to the ballnut 6 but such that the lubricant supply piston 44 may rotationally slip on the ballscrew 4 when the lubricant supply piston 44 reaches an axial limit position within the lubricant receiving chamber 40. For example, the lubricant supply piston 44 may be mounted with a small interference fit on the ballscrew 4. The radially inner section at least of the lubricant supply piston 44 may be resilient so as to resiliently grip the ballscrew 4.

The lubricant supply piston 44 is provided with first and second axial stops 48, 50 projecting axially from the front and rear surfaces 52, 54 of the lubricant supply piston 44. The lubricant receiving chamber 40 is similarly provided with first and second axial stops 56, 58. In this embodiment, the axial stops 56, 58 of the lubricant receiving chamber 40 are formed on the front wall 60 and rear wall 62 respectively of the lubricant receiving chamber 40. However, they may be positioned at any desired axial position within the lubricant receiving chamber 40 to set the axial stroke of the lubricant supply piston 44.

The stops 48, 50, 56, 58 are formed as rotary dogs such that opposing circumferentially faces of the stops 48, 50, 56, 58 will come into contact upon rotation of the ballscrew 4, stopping rotation of the lubricant supply piston 44. When this occurs, the ballscrew 4 can continue to rotate due to the relatively low frictional engagement of the lubricant supply piston 44 on the ballscrew 4.

While the stops 48, 50, 56, 58 are illustrated in this embodiment as being inter-engaging rotary dogs, other forms of stop may be employed. For example, in some embodiments, the stops 48, 50, 56, 58 may simply be formed by the front and rear faces 52, 54 of the lubricant supply piston 44 and the front and rear walls 60, 62 of the lubricant receiving chamber 40 respectively.

The flow of lubricant 22 between the lubricant reservoir 30 and the lubricant receiving chamber 40 is controlled by a valve.

In this embodiment, the valve is formed by a radially outer surface 64 of the lubricant supply piston 44. As can be seen, the radially outer surface 64 of the lubricant supply piston will selectively cover or uncover the outlet 66 of the lubricant supply passage 42 as the lubricant supply piston 44 moves axially in the lubricant receiving chamber 40. The outlet 66 of the lubricant supply passage 42 is arranged adjacent the front face 52 of the lubricant supply piston 44 when the lubricant supply piston 44 is in its rearmost position in the lubricant receiving chamber 40.

Having described the construction of the actuator 2, its operation will now be described.

Figure 3:
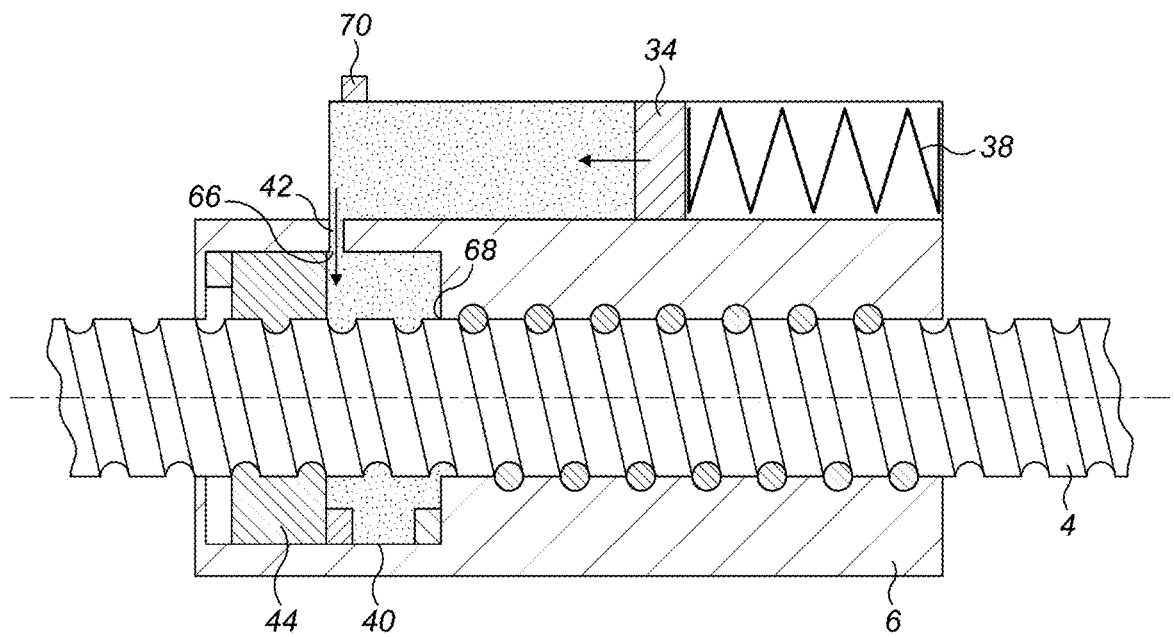
FIG. 3 shows the ballscrew actuator of FIG. 1 in a first operating configuration.

FIG. 3 shows the actuator 2 with the lubricant supply piston 44 in its rear limit position within the lubricant receiving chamber 40. In this position, the stops 50, 58 on the lubricant supply piston 44 and lubricant receiving chamber 40 are engaged with one another. It will be seen that in this position, the radially outer surface 64 of the lubricant supply piston 44 does not cover the outlet 66 of the lubricant supply passage 42 meaning that lubricant 22 can be supplied into the lubricant receiving chamber 40 through the lubricant supply passage 42 under pressure from the lubricant pressurisation piston 34. Any air which may be present in the lubricant receiving chamber 40 will be displaced by the lubricant 22 as it enters the lubricant receiving chamber 40, for example escaping through the ballnut/ballscrew interface 28. The outlet 66 of the lubricant supply passage 42 is advantageously arranged such that it is adjacent the front face 52 of the lubricant supply piston 44 such that the outlet 66 will be closed quickly upon forward movement of the lubricant supply piston 44 to prevent lubricant 22 being forced back into the lubricant reservoir 30.

Figure 4:
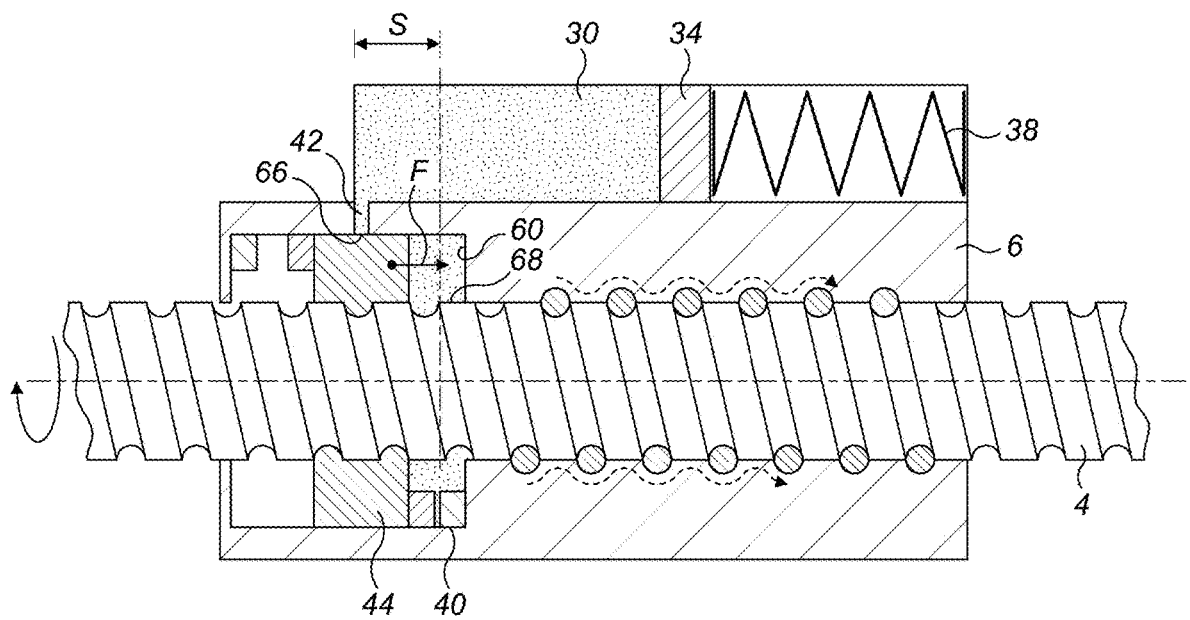
FIG. 4 shows the ballscrew actuator of FIG. 1 in a second operating configuration.

To move the ballnut 6 relative to the ballscrew 4 the ballscrew 4 is rotated such that the ballnut 6 will move to the left relative to the ballscrew 4. Due to the frictional engagement of the lubricant supply piston 44 on the ballscrew 4, the lubricant supply piston 44 will rotate with the ballscrew 4 and therefore move forward in direction F relative to the ballnut 6 through the lubricant receiving chamber 40 with the ballscrew 4, as illustrated in FIG. 4. As it does, it forces lubricant 22 into the interface 28 between the ball nut 6 and ballscrew 4 through an opening 68 in the front wall 60 of the lubricant receiving chamber 40. Flow of new lubricant 22 into the lubricant receiving chamber 40 is prevented by the radially outer surface 64 of the lubricant supply piston 44 covering the outlet 66 of the lubricant supply passage 42. This also prevents lubricant 22 from the lubricant receiving chamber 40 flowing back into the lubricant reservoir 30.

The lubricant supply piston 44 will continue to move forwardly in the lubricant receiving chamber 40 until such time as rotation of the ballscrew 4 stops or, more usually, until the stops 44, 56 on the lubricant supply piston 40 and lubricant supply chamber front wall 60 engage. The position of the front surface 52 of the lubricant supply piston 44 in this configuration is shown by dotted lines in FIG. 4. In the latter case, the 44 will have travelled a stroke S which will dispense a predetermined volume of lubricant 22 from the lubricant receiving chamber 40 into the ballscrew/ballnut interface 28. The size of the stroke and volume of the lubricant receiving chamber 40 can be adapted to provide a suitable dispensed volume.

It will be noted that in the forward most position of the lubricant supply piston 44, the radially outer surface 64 of the lubricant supply piston 44 will cover the outlet 66 of the lubricant supply passage 42. This prevents lubricant 22 from entering the lubricant supply chamber 40 behind the lubricant supply piston 44.

The ballscrew 4 can continue to rotate relative to the ballnut 6 as the ballnut 6 moves to a desired extended position by virtue of the lubricant supply piston 44 being able to slip on the ballscrew 4.

Figure 5:
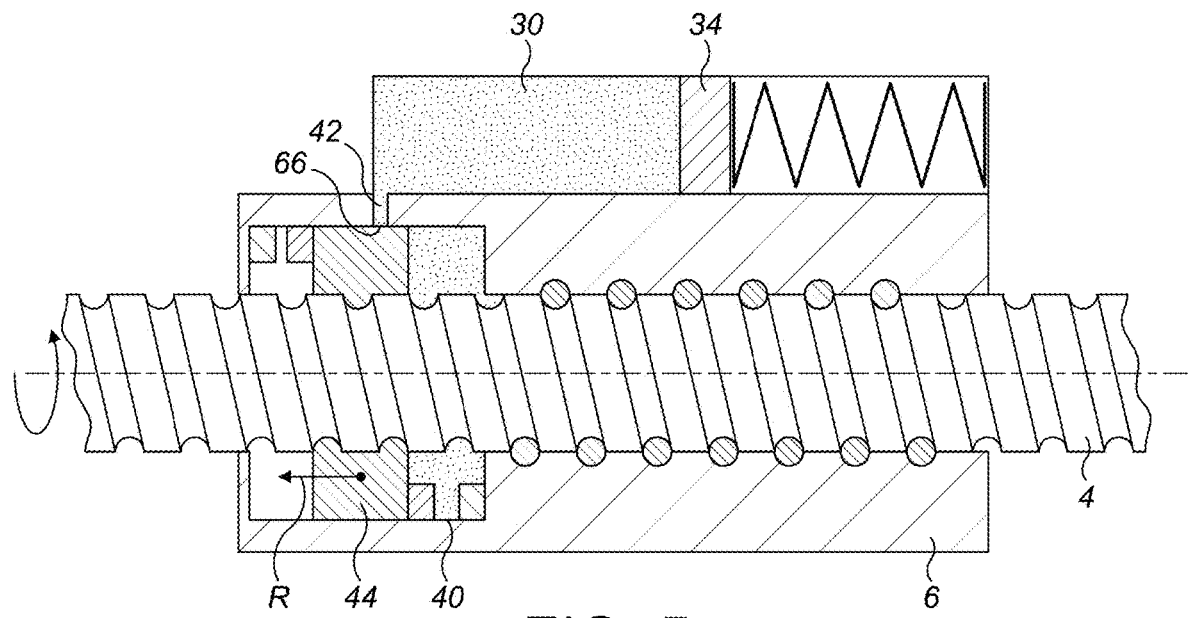
FIG. 5 shows the ballscrew actuator of FIG. 1 in a third operational configuration.

When the actuator 2 is to be retracted, the ballscrew 4 is rotated in an opposite direction so as to move the ballnut 6 in the opposite direction. As shown schematically in FIG. 5, due to the frictional engagement of the lubricant supply piston 44 on the ballscrew 4, it will rotate with the ballscrew 4 and also move rearwardly through the lubricant supply chamber 40 in the direction R. As it does so, any air in the lubricant receiving chamber 40 behind the rear face 54 of the lubricant supply piston 44 can be displaced through the second end 26 of the ballnut 6. Also, pressure in the areas behind the rear face 54 of the lubricant supply piston 44 and the front face 52 of the lubricant supply piston 44 can equilibrate due to there being a non-airtight seal between the lubricant supply piston 44 and the internal wall of the lubricant receiving chamber 40. This is possible due to a difference in the viscosity of the lubricant and air, which may allow air to escape, but not a more viscous lubricant.

Rearward movement of the lubricant supply piston 44 will continue until such time as the stops 50, 58 on the lubricant supply piston 44 and lubricant receiving chamber 40 engage as shown in FIG. 3, whereupon the lubricant supply piston 44 will rotationally slip on the ballscrew 4, thereby allowing continued rotation of the ballscrew 4 to move the ballnut 6 to its retracted position. As the lubricant supply piston 44 moves rearwardly through the lubricant receiving chamber 40, its radially outer surface 64 will uncover the outlet 66 of the lubricant supply passage 42, thereby allowing lubricant 22 once more to be admitted into the lubricant receiving chamber 40 in front of the lubricant supply piston 44 under pressure from the lubricant reservoir 30. A predetermined volume of lubricant 22 is dispensed into the lubricant receiving chamber 40 under the pressure exerted by the lubricant pressurising piston 34.

This sequence of operations will continue until such time as no further lubricant 22 can be dispensed from the lubricant reservoir 30. At that point, the lubricant reservoir 30 may be refilled and the biasing spring 38 re-compressed.

A sensor 70 may be provided which indicates the amount of lubricant 22 remaining in the lubricant chamber 30. The sensor 70 could for example, sense or provide an indication of the position of the lubricant pressurising piston 34. The sensor 70 could therefore be a switch or a linear variable differential transformer for example. When the sensor 70 indicates that the lubricant 22 has reached a predetermined low level, the actuator 2 may be taken out of service and the lubricant reservoir replenished.

It will be understood from the above that embodiments of the disclosure are advantageous in that they allow for lubricant 22 to be supplied to a screw/nut interface 28 throughout the life of the actuator 2. This means that lubricant 22 lost from the nut 6 is constantly replenished meaning that the need for an operator to reapply lubricant manually is much reduced. That means that the actuator 2 can remain in service for much longer without maintenance. It also provides prolonged corrosion resistance due to the prolonged presence of lubricant within the nut 6.

The disclosure is applicable to all forms of screw actuators 2, but is particularly applicable to ballscrew actuators 2.

Figure 6:
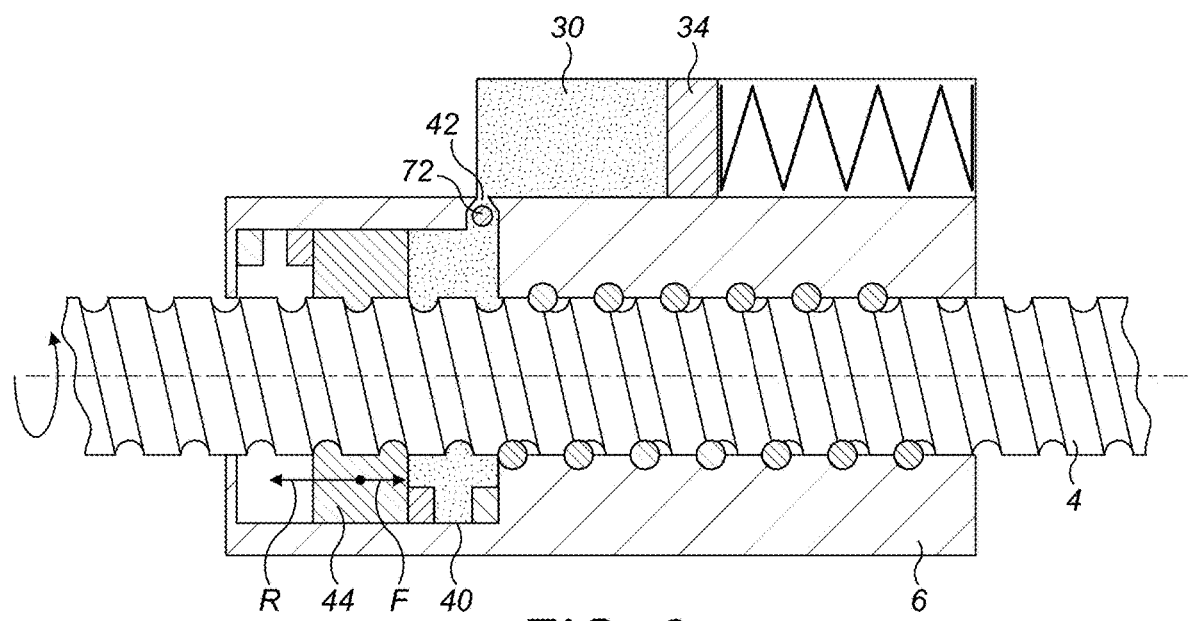
FIG. 6 shows a second embodiment of ballscrew actuator in accordance with the disclosure.

A second embodiment of actuator to the disclosure is illustrated in FIG. 6.

The basic construction of the actuator 2 of this embodiment is substantially the same as that in the first embodiment described above and need not therefore be described further in detail. However, in this embodiment, the flow of lubricant 22 between the lubricant reservoir 30 and the lubricant receiving chamber 40 is controlled by a non-return valve 72 rather than by the radially outer surface 64 of the lubricant supply piston 44.

In this embodiment, therefore, a non-return valve 72 is provided in the lubricant supply passage 42. This means that during rearward movement R of the lubricant supply piston 44 through the lubricant receiving chamber 40, lubricant can be admitted from the lubricant 30 through the non-return valve 72. However, with forward movement F of the lubricant supply piston 44 through the lubricant receiving chamber 40, flow of lubricant 22 from the lubricant receiving chamber 40 to the lubricant reservoir 30 is blocked by the non-return valve 72.

The non-return valve 72 is advantageously arranged adjacent the forward end of the lubricant receiving chamber 40 so as to avoid interference with the lubricant supply piston 44 as it moves within the lubricant receiving chamber 40. An embodiment using a non-return valve 72 may be advantageous particularly in installations where the volume of lubricant 22 being dispensed on each cycle is relatively large, which might, with the construction of the earlier embodiment require the lubricant supply piston 44 to be relatively wide so as to provide the necessary opening and closing of the lubricant supply passage 42. This may add unnecessary weight to the actuator, which is undesirable particularly in aviation applications.

It will be understood that the Figures are schematic and not to scale. The various components will be sized so as to provide the required dosage of lubricant 22 in each operating cycle.

While the embodiment above has been described in terms of an actuator which has a rotary screw 4 and axially translatable nut 6, the disclosure is also applicable to actuators in which the nut 6 rotates and the screw 4 translates. In such an embodiment, the lubricant supply piston 44 will still rotationally slip on the screw 4 when the lubricant supply piston 44 reaches its limit positions in the lubricant receiving chamber 40.

Also, while disclosure has been illustrated as applied to a ballscrew actuator, it will be applicable to all forms of rotary screw actuators 2.

The invention claimed is:

1. A screw actuator comprising:
a nut having an internal helical formation;
a screw having an external helical formation and rotatably received within the nut, relative rotational movement of the nut and screw causing axial movement of one of the nut and screw relative to the other of the nut and screw;
a lubricant reservoir;
a lubricant pressuriser for pressurising lubricant within the lubricant reservoir;
a lubricant receiving chamber formed in the nut and through which the screw extends;
a lubricant supply passage fluidly connecting the lubricant reservoir and the lubricant receiving chamber;
a valve for controlling the flow of lubricant between the lubricant reservoir and the lubricant receiving chamber; and
a lubricant supply piston received in the lubricant receiving chamber,
the lubricant supply piston mounted on the external helical formation of the screw,
the lubricant supply piston being mounted to the screw with sufficient friction that in response to relative rotational movement of the screw and the nut resulting in relative axial movement of the screw and the nut, the lubricant supply piston can move axially with the screw relative to the nut through the lubricant receiving chamber so as to force lubricant from the lubricant receiving chamber into an interface between the nut and the screw, but such that the lubricant supply piston may rotationally slip on the screw when the lubricant supply piston reaches an axial limit position within the lubricant receiving chamber.

2. A screw actuator as claimed in claim 1, wherein the lubricant pressuriser comprises a pressurisation piston slidably mounted within the lubricant reservoir and a spring for urging the pressurisation piston into the lubricant reservoir to pressurise the lubricant.

3. A screw actuator as claimed in claim 2, wherein the spring is a mechanical spring, for example a compression spring.

4. A screw actuator as claimed in claim 1, wherein the valve comprises a radially outer surface of the lubricant supply piston which is arranged to selectively cover and uncover an outlet of the lubricant supply passage as the lubricant supply piston moves axially within the lubricant supply chamber.

5. A screw actuator as claimed in claim 4, wherein the outlet of the lubricant supply passage is arranged adjacent a front surface of the lubricant supply piston when the lubricant supply piston is in a rearmost position within the lubricant receiving chamber.

6. A screw actuator as claimed in claim 1, wherein the valve comprises a non-return valve arranged in the lubricant supply passage.

7. A screw actuator as claimed in claim 6, wherein an outlet of the lubricant supply passage is arranged adjacent a front wall of the lubricant receiving chamber.

8. A screw actuator as claimed in claim 1, comprising one or stops for limiting the axial movement of the lubricant supply piston within the lubricant receiving chamber, wherein the stops optionally comprise interengaging rotary dogs provided on the lubricant supply piston and the lubricant receiving chamber respectively.

9. A screw actuator as claimed in claim 1, wherein the screw rotates and the nut translates along the screw.

10. A screw actuator as claimed in claim 1, wherein the nut is a ballnut and the screw is a ballscrew the helical formations on the nut and screw being respective grooves, the groove on the ballnut being opposed to the groove on the ballscrew so as to form at least one helical raceway therebetween, the actuator further comprising a plurality of balls or rolling elements disposed in the at least one helical raceway.

11. A method of supplying lubricant to a screw actuator comprising a nut and a screw rotatably received within the nut, the method comprising:
pressurising lubricant in a lubricant reservoir;
selectively admitting lubricant from the lubricant reservoir into a lubricant receiving chamber within the nut; and
pressing lubricant from the lubricant receiving chamber into an interface between the nut and the screw by means of a lubricant supply piston mounted on the screw within the lubricant receiving chamber and which moves axially with the screw through the lubricant receiving chamber in response to relative rotation of the screw and the nut.

12. A method as claimed in claim 11, comprising pressuring the lubricant within the lubricant reservoir by means of a spring loaded piston.

13. A method as claimed in claim 11, comprising admitting lubricant into the lubricant receiving chamber through a non-return valve.

14. A method as claimed in claim 11, comprising admitting lubricant into the lubricant receiving chamber through a lubricant supply passage which is selectively opened and closed by the lubricant supply piston as it moves through the lubricant receiving chamber.

15. A method as claimed in claim 11, further comprising:
mounting the lubricant supply piston to the screw with sufficient friction that the lubricant supply piston can move axially with the screw through the lubricant receiving chamber in response to relative axial rotation of the screw and nut so as to force lubricant from the lubricant receiving chamber into the interface between the nut and the screw, but such that the lubricant supply piston may rotationally slip on the screw when the lubricant supply piston reaches an axial limit position within the lubricant receiving chamber.

* * * * *